(12) United States Patent
Lange et al.

(10) Patent No.: US 12,516,768 B2
(45) Date of Patent: Jan. 6, 2026

(54) MAGNETIC SOFT STOPS FOR GIMBALS

(71) Applicant: Goodrich Corporation, Charlotte, NC (US)

(72) Inventors: Davis A. Lange, Sturbridge, MA (US); Luke N. Asselin, Amesbury, MA (US); Christopher William Helmke, Bedford, NH (US)

(73) Assignee: GOODRICH CORPORATION, Charlotte, NC (US)

( * ) Notice: Subject to any disclaimer, the term of this patent is extended or adjusted under 35 U.S.C. 154(b) by 166 days.

(21) Appl. No.: 17/812,943

(22) Filed: Jul. 15, 2022

(65) Prior Publication Data

US 2023/0003337 A1    Jan. 5, 2023

Related U.S. Application Data

(62) Division of application No. 16/584,379, filed on Sep. 26, 2019, now abandoned.

(60) Provisional application No. 62/737,057, filed on Sep. 26, 2018.

(51) Int. Cl.
*F16M 11/12* (2006.01)
*F16M 11/18* (2006.01)
*G03B 17/56* (2021.01)

(52) U.S. Cl.
CPC .......... *F16M 11/123* (2013.01); *F16M 11/18* (2013.01); *G03B 17/56* (2013.01); *G03B 17/561* (2013.01); *F16M 2200/021* (2013.01); *F16M 2200/041* (2013.01)

(58) Field of Classification Search
CPC .................................................. F16M 11/123
See application file for complete search history.

(56) References Cited

U.S. PATENT DOCUMENTS

| 4,175,832 A | 11/1979 | Umeki et al. |
| 5,598,207 A | 1/1997 | Kormos et al. |
| 7,602,134 B1 | 10/2009 | Taylor et al. |
| 7,710,337 B2 * | 5/2010 | Blalock ................. H01Q 1/125 343/765 |
| 8,179,007 B2 * | 5/2012 | Van Der Walt ........ H02K 41/03 310/90.5 |
| 9,182,580 B1 | 11/2015 | Clawges et al. |
| 2012/0274563 A1 * | 11/2012 | Olsson ................... G05G 9/047 345/161 |

(Continued)

FOREIGN PATENT DOCUMENTS

DE    102016004674 A1    10/2017

OTHER PUBLICATIONS

The Extended European Search Report for corresponding European Patent Application No. EP19199795.6, dated Jan. 31, 2020.

*Primary Examiner* — Noam Reisner
(74) *Attorney, Agent, or Firm* — CANTOR COLBURN LLP

(57) ABSTRACT

A gimbal arrangement includes a static structure, a gimbal supported for rotation relative to the static structure, an actuator operably connected to the gimbal and configured to rotate the gimbal relative to the static structure, and a magnetic soft stop. The magnetic soft stop is connected between the static structure and the gimbal to limit rotation of the gimbal relative to the static structure to within a predetermined range. Sensor systems and imaging methods are also described.

15 Claims, 6 Drawing Sheets

(56) References Cited

U.S. PATENT DOCUMENTS

2018/0113462 A1\* 4/2018 Fenn ................. F16M 11/2028
2019/0215451 A1 7/2019 Enke et al.

\* cited by examiner

MAGNETIC SOFT STOPS FOR GIMBALS

CROSS REFERENCE TO RELATED APPLICATIONS

This application is a divisional of U.S. patent application Publication Ser. No. 16/584,379 filed Sep. 26, 2019, which claims priority to and the benefit of U.S. Provisional Patent Application Ser. No. 62/737,057 filed Sep. 26, 2018 the disclosures of each are herein incorporated by reference in their entirety.

BACKGROUND OF THE INVENTION

1. Field of the Invention

The present disclosure relates to sensor systems, and more particularly to magnetic soft stops for limiting rotation of gimbals in sensor systems.

2. Description of Related Art

Camera systems, such as cameras carried by vehicles like aircraft, are commonly used to image scenes. The camera system generally includes a camera which is mounted to a gimbal. The gimbal typically rotates such that the camera field of view sweeps across the scene to be imaged while the camera collects image data. The image data is then communicated from the camera to an off-gimbal device for further processing or analysis. Where the camera communicates digitally roll-flex cabling is commonly used to connect the movable camera to static structure. Typically, mechanical hard stops are employed to limit rotation of the gimbal. The mechanical hard stop prevents the rotation of the gimbal from damaging the cabling and/or other structures in the camera system.

One challenge to mechanical hard stops is that the contact between the gimbal and the hard stop can potentially damage the camera system, such as from forces exerted on the camera system by acceleration and/or shock during flight. Mechanical hard stops can also impose limitations on the imaging capability of camera systems employing more than one camera with differently sized fields of view.

Such conventional methods and systems have generally been considered satisfactory for their intended purpose. However, there is still a need in the art for improved gimbal arrangements, sensor systems, and imaging methods. The present disclosure provides a solution for this need.

SUMMARY OF THE INVENTION

A gimbal arrangement includes a static structure, a gimbal supported for rotation relative to the static structure, an actuator operably connected to the gimbal and configured to rotate the gimbal relative to the static structure, and a magnetic soft stop. The magnetic soft stop is connected between the static structure and the gimbal to limit rotation of the gimbal relative to the static structure to within a predetermined range.

In certain embodiments the magnetic soft stop can include an electromagnet. The electromagnet can be fixed relative to the static structure. The electromagnet can be fixed relative to the gimbal. The magnetic soft stop can include a permanent magnet. The permanent magnet can be fixed relative to the static structure. The permanent magnet can be fixed relative to the gimbal. It is contemplated that the magnetic soft stop can include a ferromagnetic body. The ferromagnetic body can be fixed relative to the static structure or the gimbal.

In accordance with certain embodiments, there can be no mechanical hard stop arranged between the gimbal and the static structure. The magnetic stop can conform in fit and form to a mechanical hard stop for a DB-110 sensor system. A controller can be operably connected to the magnetic soft stop. The controller can be disposed in communication with a memory having instructions recorded on the memory to activate the magnetic soft stop and limit rotation of the gimbal relative to the static structure to a predetermined range. A sensor, such as an imaging sensor can be fixed relative to the gimbal.

It is contemplated that the gimbal can be arranged about a roll axis relative to the static structure. The gimbal can be arranged about a pitch axis relative to the static structure. The gimbal can be a first gimbal and the gimbal arrangement can include a second gimbal. The magnetic soft stop can be a first magnetic soft stop and the gimbal arrangement can include a second magnetic soft stop. The second soft stop can be connected between the second gimbal and the first gimbal to limit rotation of the second gimbal relative to the first gimbal.

A sensor system includes a gimbal arrangement as described above. A sensor is fixed relative to the gimbal. A controller is operably connected to the magnetic soft stop and is disposed in communication with a memory having instructions recorded on the memory to activate the magnetic soft stop and limit rotation of the gimbal relative to the static structure to a predetermined range. In certain embodiments the magnetic soft stop can include an electromagnet fixed relative to one of the static structure and the gimbal. A permanent magnet can be fixed relative to the other of the static structure and the gimbal. There can be no mechanical hard stop arranged between the gimbal and the static structure.

An imaging method includes, at a gimbal arrangement as described above, activating the magnetic soft stop and limiting rotation of the gimbal relative to the static structure to a predetermined range using the activated magnetic soft stop. It is contemplated that strength of opposition between an electromagnet fixed relative to one of the gimbal and the static structure can be increased as the gimbal rotates toward a limit of the predetermined range limit deceleration of the gimbal as the gimbal reaches the limit of the predetermined range.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
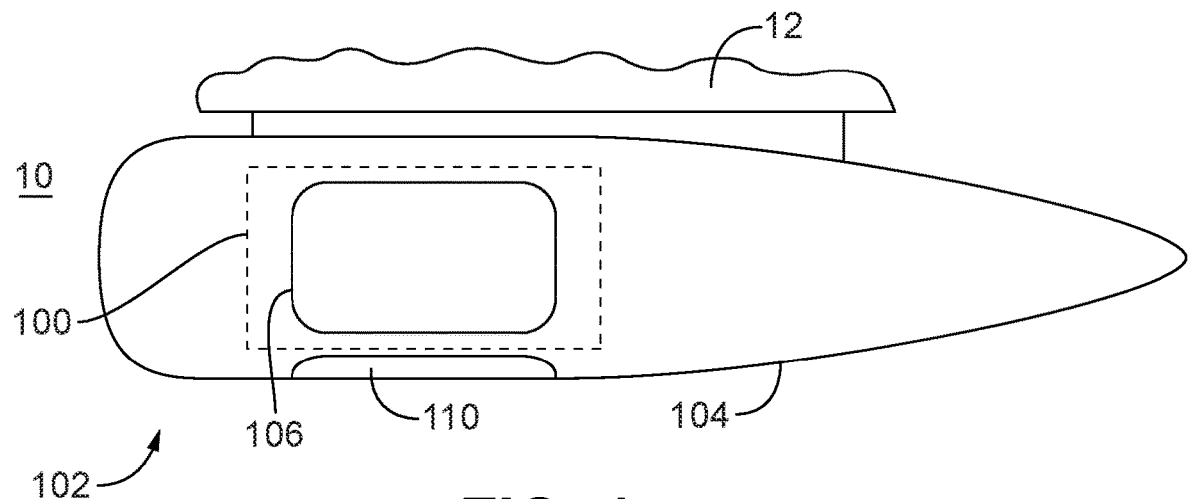
FIG. 1 is side elevation view of an exemplary embodiment of a sensor system constructed in accordance with the present disclosure, showing a gimbal arrangement of the sensor system.

Reference will now be made to the drawings wherein like reference numerals identify similar structural features or aspects of the subject disclosure. For purposes of explanation and illustration, and not limitation, a sensor system with a gimbal arrangement having a magnetic soft stop is shown in FIG. 1 and is generally indicated by reference character 100. Other embodiments of gimbal arrangements, sensor systems, and imaging methods are shown in FIGS. 2-15, as will be described. The systems and methods described herein can be used in intelligence surveillance and reconnaissance (ISR) sensor systems, such as in sensor systems having two or more sensors, though the present disclosure is not limited to ISR systems or to sensor systems having two or more sensors.

Referring to FIG. 1, sensor system 102 is shown. Sensor system 102 includes gimbal arrangement 100 and is enveloped within the interior of a faring 104. Faring 104 includes a window 106 which provides a viewing area for data collection from a scene 10 located outside of faring 104. In the illustrated exemplary embodiment window 106 is a first window and faring 104 includes at least one second window, e.g., a second window 108 (shown in FIG. 3) and a third window 110. It is contemplated that sensor system 102 be arranged as an ISR sensor system, such as an ISR system carried by an aircraft 12. Examples of suitable ISR sensor systems include dual-band ISR sensor systems, such as DB-110 sensor systems, available United Technologies Aerospace Systems of Charlotte, N.C.

Figure 2:
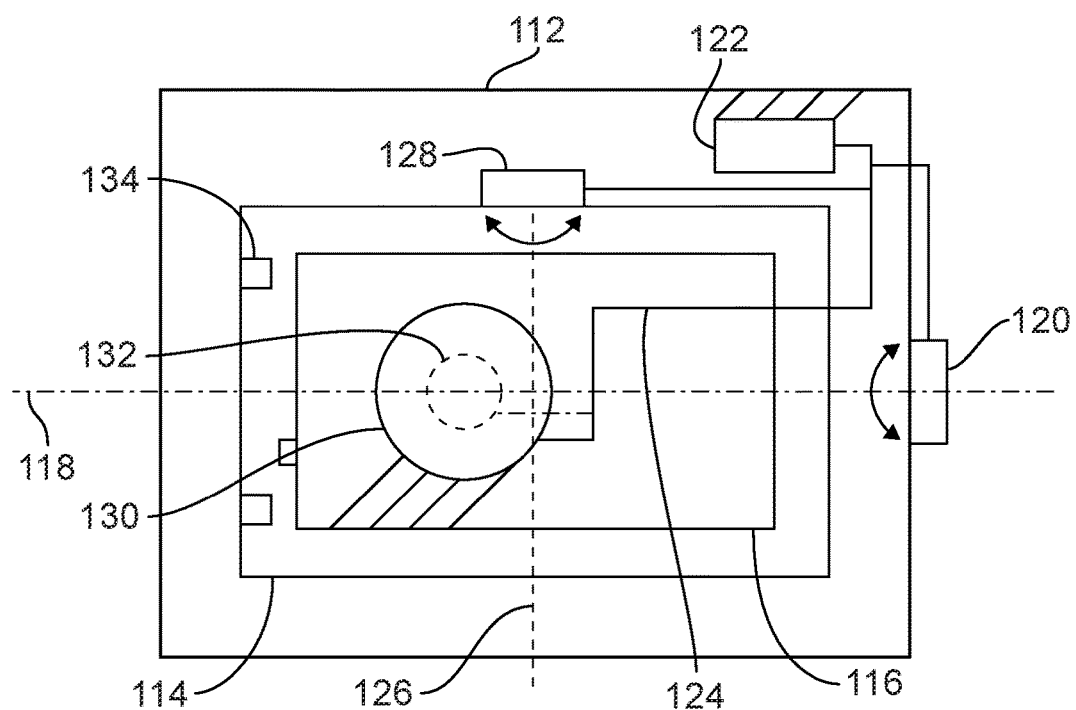
FIG. 2 is a side elevation view of the sensor system of FIG. 1 with the faring removed, schematically showing the gimbal arrangement and a magnetic soft stop.

With reference to FIG. 2, gimbal arrangement 100 is shown. Gimbal arrangement 100 includes a static structure 112, a roll gimbal 114, and pitch gimbal 116. Faring 104 (shown in FIG. 1) is fixed relative to static structure 112 and is supported thereby. Roll gimbal 114 is connected to static structure 112 and is supported thereby for rotation about a roll axis 118. Rotation of roll gimbal 114 about roll axis 118 is effected by a roll resolver/drive arrangement 120, which is operably connected to roll gimbal 114 for rotating roll gimbal 114 about roll axis 118. As shown in FIG. 2 a controller 122 is disposed in communication with roll resolver/drive arrangement 120 through cabling 124, through which controller 122 controls rotation of roll gimbal 114 about roll axis 118.

Pitch gimbal 116 is connected to roll gimbal 114 and is supported thereby for rotation about a pitch axis 126. Rotation of pitch gimbal 116 about pitch axis 126 is effected by a pitch resolver/drive arrangement 128, which is operably connected to pitch gimbal 116 for rotating pitch gimbal 116 about pitch axis 126 and which is itself carried by roll gimbal 114. As also shown in FIG. 2 controller 122 is disposed in communication with pitch resolver/drive arrangement 128 through cabling 124, through which controller 122 also controls rotation of pitch gimbal 116 about pitch axis 126.

Pitch gimbal 116, and therethrough roll gimbal 114, carry a first sensor 130 and a second sensor 132. Second sensor 132 is arranged on a side of roll axis 118 opposite first sensor 130, either (or both) first sensor 130 and second sensor 132 being disposed in communication with controller 122 for receiving data from either (or both) first sensor 130 and second sensor 132. Data from first sensor 130 and second sensor 132 is provided through cabling 124, which provides connectivity for digital data communication between the sensors and controller 122. In certain embodiments cabling 124 is roll-flex type cabling.

Controller 122 is fixed relative to static structure 112. Since cabling 124 runs between movable structures, e.g., pitch resolver/drive arrangement 128, first sensor 130, and second sensor 132, it is necessary to limit the movement of one or more of the movable structures relative to static structure 112. This prevents damage on cabling 124 that could otherwise occur from rotation of roll gimbal 114. Limitation of movement of roll gimbal 114 is effected by a magnetic soft stop 134. As will be appreciated by those of skill in the art in view of the present disclosure, the disadvantages otherwise associated with having to manage cabling 124 can be offset by the advantages provided by the quality of the data communication connection provided by cabling 124, which allows first sensor 130 and second sensor 132 to communicate image data with the data loss that could otherwise accompany the use of a slip ring or other type of data communication interface. Although a particular magnetic soft stop arrangement is shown, e.g., magnetic soft stops connected to static structure and a fixed stop member connected to a gimbal, it is to be understood and appreciated that other arrangements are possible within the scope of the present disclosure. For example, magnetic soft stops can be carried by the gimbal. Further, pitch gimbal 14 can alternatively/additionally stopped using one or more magnetic soft stops, as suitable for an intended application.

Figure 3:
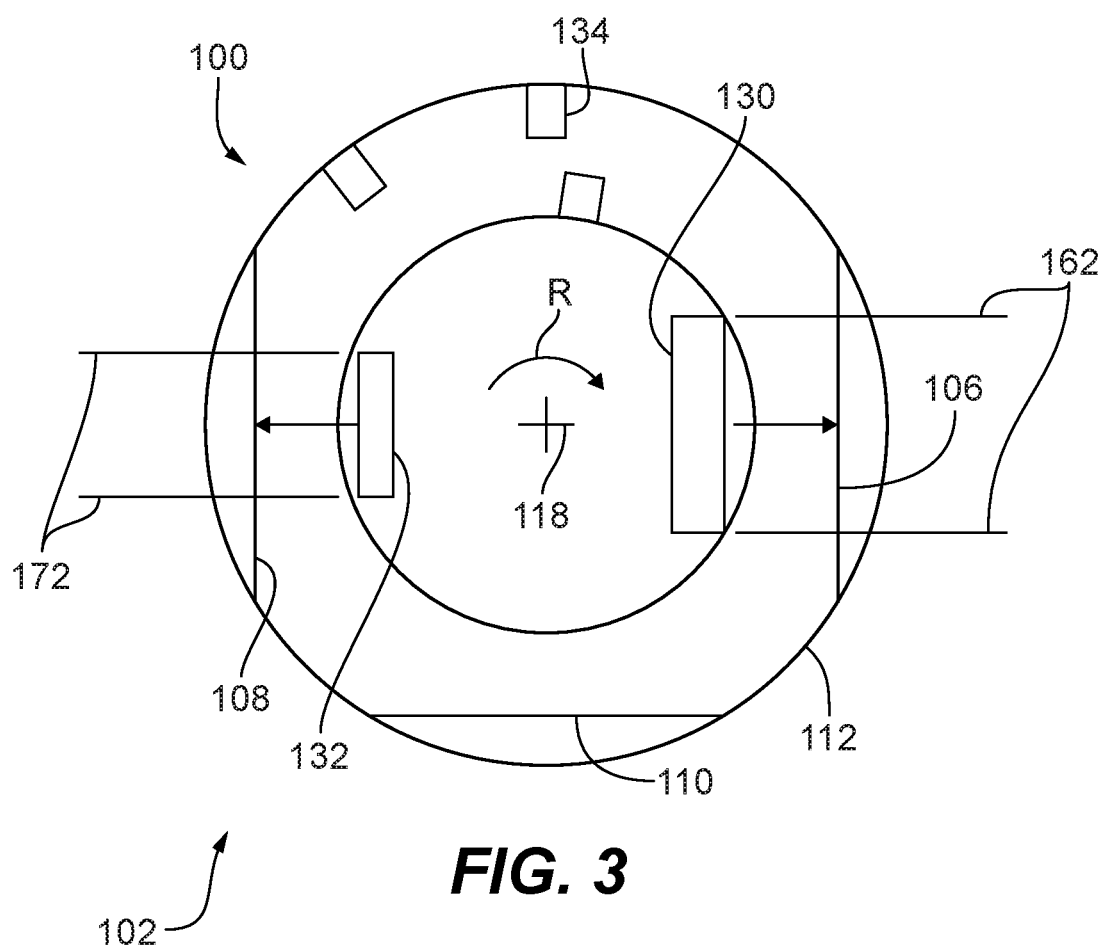
FIG. 3 is a axial end view of the sensor system of FIG. 1 with the faring removed, schematically showing first and second sensors carried by a roll gimbal with the magnetic soft stop arranged to limit rotation of the roll gimbal about a roll axis.

With reference to FIG. 3, sensor system 102 is shown in an axial end view. As shown in FIG. 3 roll gimbal 114 extends about roll axis 118 and carries first sensor 130 and second sensor 132. Static structure 112 extends about roll gimbal 114 and is located radially outward of roll gimbal 114. Magnetic soft stop 134 is fixed relative to static structure 112. Second sensor 132 is arranged on a side of roll axis 118 opposite first sensor 130 and has a second sensor field of 172. Second sensor field of view 172 is smaller than a field of view 162 of first sensor 130. In certain embodiments first sensor 130 can be a wide field of view sensor, such as optical waveband sensor. Examples of optical waveband sensors include cameras and telescopes. In accordance with certain embodiments second sensor 132 can be a narrow field of view sensor, such as an infrared waveband sensor. Examples of infrared sensors include infrared sub-waveband imaging arrays.

Figure 4:
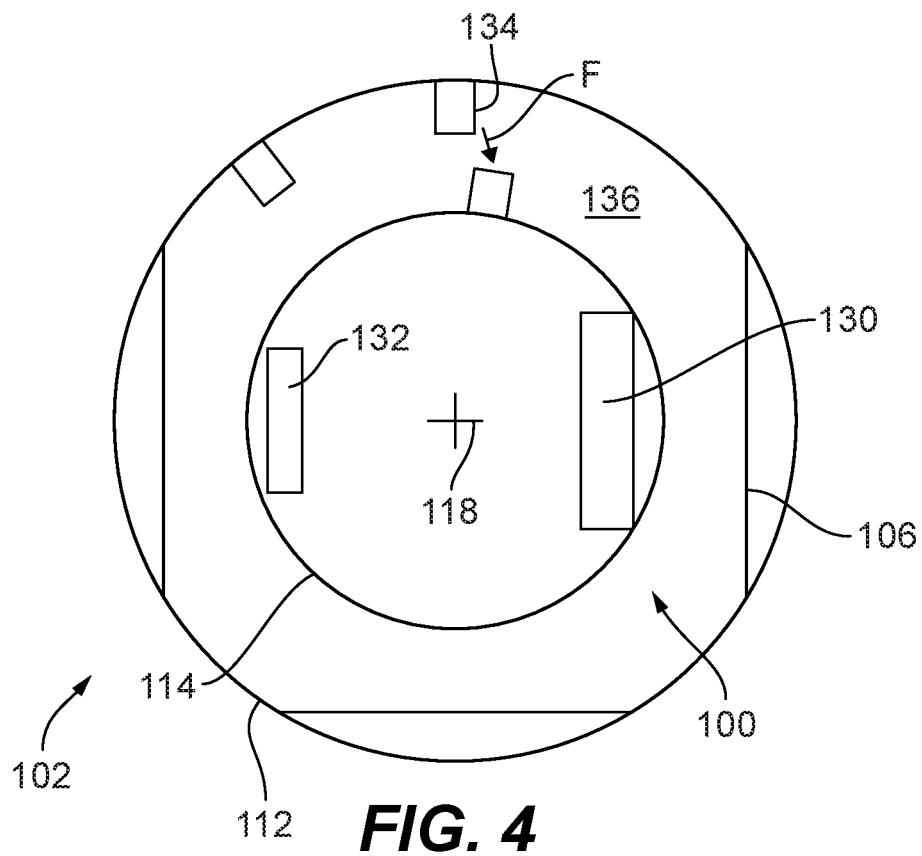
FIGS. 4 and 5 are axial end view of the sensor system of FIG. 1 with the faring removed, showing the gimbal in first and second positions.
Figure 5:
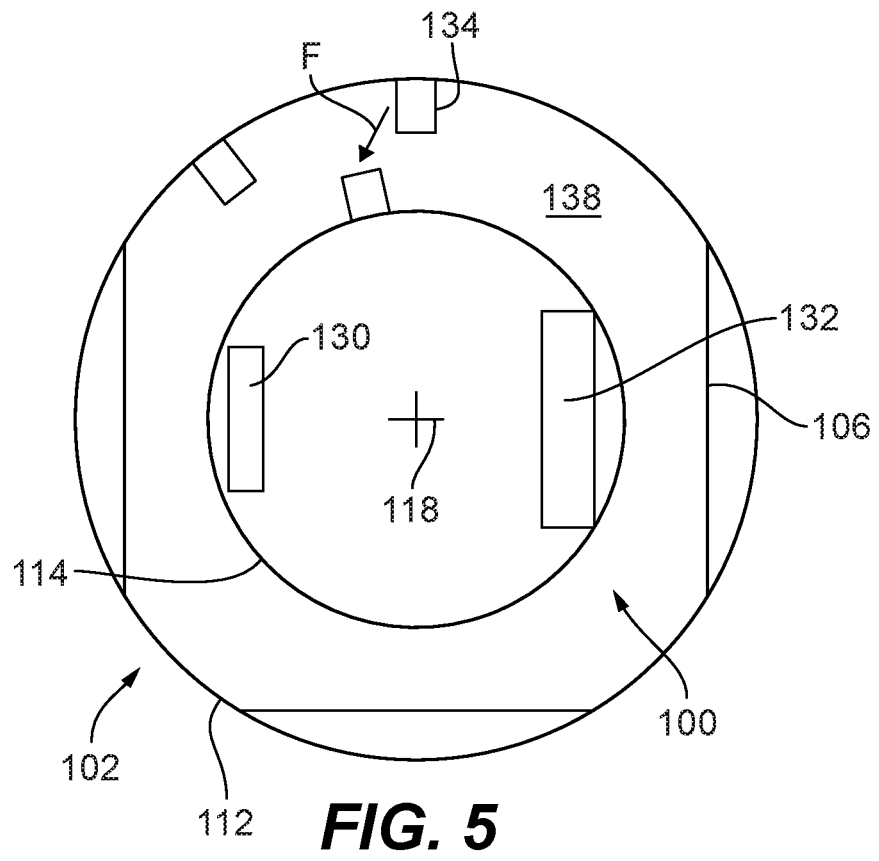

Referring to FIGS. 4 and 5, sensor system 102 and gimbal arrangement 100 are shown. Roll gimbal 114 has a plurality of rotational positions, e.g., a first position 136 (shown in FIG. 4) and a second position 138 (shown in FIG. 5) offset about roll axis 118 by 180 degrees. Roll resolver/drive arrangement 120 is operably connected to roll gimbal 114 and is configured and adapted to move roll gimbal 114 between first position 136 and second position 138. In first position 136 roll gimbal 114 has a rotary orientation about roll axis 118 such that first sensor 130 is positioned proximate to window 106 for viewing scene 10 (shown in FIG. 1) through window 106. In second position 138 roll gimbal 114 is rotated 180 degrees relative to first position 136 such that second sensor 132 is positioned proximate to window 106 for imaging scene 10.

As will be appreciated by those of skill in the art, mechanical hard stops can be used to limit the rotation of gimbals. Mechanical hard stops have the advantage that the they can prevent movement of the gimbal from outside of the intended movement range of gimbal, e.g., outside of predetermined movement range, such as due acceleration and/or shocks that can be experienced by an aircraft carrying a sensor system carrying the sensor system. For example, the hard stop can physically interfere with the rotation of a gimbal beyond a certain amount of angular rotation about the rotation axis about which the gimbal is supported, potentially preventing damage to the sensor system and/or gimbal.

While generally satisfactory for their intended purpose mechanical hard stops can potentially impose a shock on the sensor itself, such as when the gimbal strikes the hard stop. Mechanical hard stops also typically prevent use of the full range of rotation of the gimbal about the rotation about the rotation axis. This can potentially limit the sensing capability of the sensor system, such as when a sensor with a relatively wide field of view carried by the gimbal is replaced with a sensor having a relatively narrow field of view, the sensor with the narrow field of view having a smaller field of regard than the sensor with the wide field of regard for a given mechanical hard stop position. To limit end of travel shock and/or allow for adjustability of end travel gimbal arrangement 100 includes magnetic soft stop 134.

Magnetic soft stop 134 includes a first magnetic body 140 and a second magnetic body 142. First magnetic body 140 is fixed relative to roll axis 118 and can include, for example a permanent magnet 140 (P), a ferromagnetic body 142 ($F_e$). or an electromagnet. e.g., electromagnet 146. Second magnetic body 142 is similar to first magnetic body 140 with the difference that second magnetic body 142 is movable relative to roll axis 118. e.g., is carried by roll gimbal 114. It is contemplated that magnetic force F between first magnetic body 140 and second magnetic body 142 limit movement of roll gimbal 114 to prevent rotary movement of roll gimbal 114 beyond a predetermined movement range, illustrated in an exemplary way in FIGS. 4 and 5 as about 180 degrees. As will be appreciated by those of skill in the art in view of the present disclosure, this can eliminate the need for a mechanical hard stop to limit rotary movement of roll gimbal 114. In certain embodiments magnetic soft stop 134 can conform in fit and form to a hard stop for a DB-110 sensor system, which simplifies integration of magnetic soft stop 134 in such sensor systems.

Figure 6:
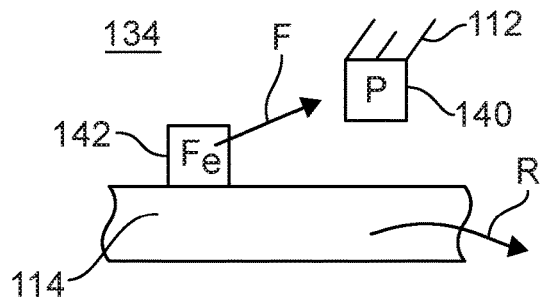
FIGS. 6-13 are sectional views of the gimbal arrangement of FIG. 1, schematically showing the magnetic soft stop implemented with permanent magnets and electromagnets.
Figure 7:
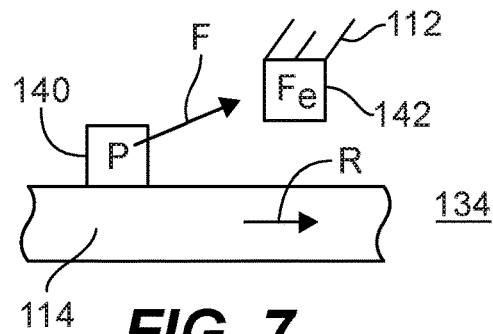

Referring now to FIGS. 6 and 7, magnetic soft stop 134 is shown. As shown in FIG. 6 magnetic soft stop 134 can include a permanent magnet 140 fixed relative to static structure 112 and a ferromagnetic member 142 fixed relative to roll gimbal 114. Use of ferromagnetic member 142 and permanent magnet 140 allows permanent magnet 140 to cooperate to draw roll gimbal 114 into first position 136 (shown in FIG. 4) and/or second position 138 (shown in FIG. 5) using an attractive force F between ferromagnetic member 142 and permanent magnet 140.

Figure 8:
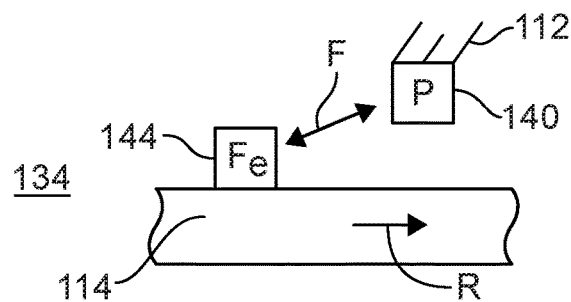

As shown in FIG. 8, permanent magnet 140 can be a first permanent magnet and magnetic soft stop 134 can include a second permanent magnet 144. Second permanent magnet 144 can be fixed relative to roll gimbal 114 such that, as roll gimbal 114 rotates second permanent magnet 144 into proximity of first permanent magnet 140 magnetic force F opposes rotation of roll gimbal 114. Because the magnitude of magnetic force F corresponds to separation between first permanent magnet 140 and second permanent magnet 144, this has the effect a decelerating rotational speed of roll gimbal 114 as second permanent magnet 144 approaches first permanent magnet 140—limiting the shock exerted on roll gimbal 114 as it reaches first position 136 (shown in FIG. 4) or second position 138 (shown in FIG. 5).

Figure 9:
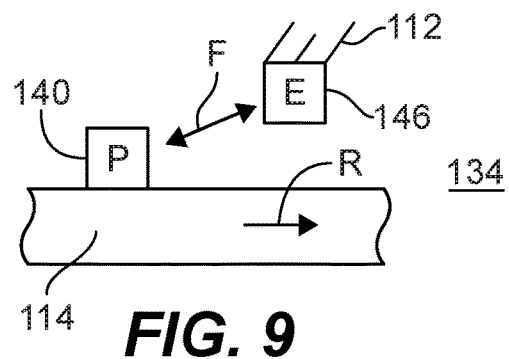
Figure 10:
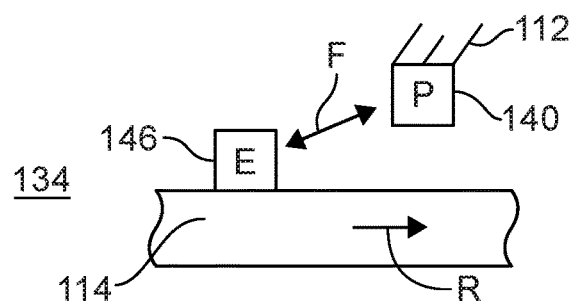
Figure 11:
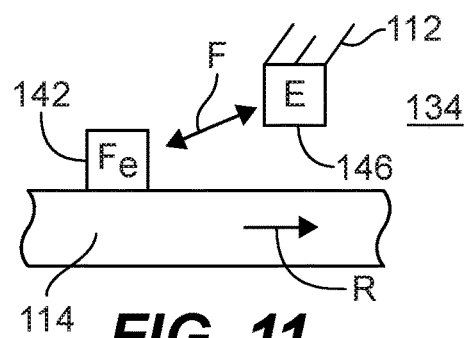
Figure 12:
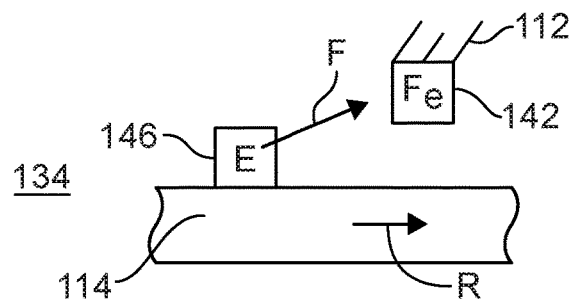
Figure 13:
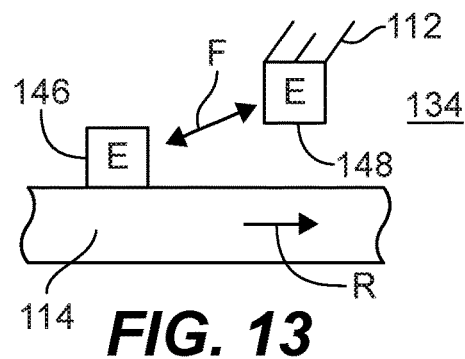

Referring to FIGS. 9-13, it is contemplated that magnetic soft stop 134 include an electromagnet 146. As shown in FIG. 9, electromagnet 146 can be fixed relative to static structure 112 and can cooperate with permanent magnet 140 to selectively generate magnetic force F. Alternatively, as shown in FIG. 10, electromagnet 146 can be carried by roll gimbal 114 and permanent magnet 140 can be fixed relative to static structure 112. Further, electromagnet 146 can cooperate with ferromagnetic member 142 with one fixed relative to static structure 112 and the other fixed relative to roll gimbal 114, as shown in FIGS. 11 and 12. It is also contemplated that electromagnet 146 can be a first electromagnet 146 and that magnetic soft stop 134 include a second magnetic soft stop 148, one of first electromagnet 146 and second electromagnet 148 being fixed to static structure 112 and the other of first electromagnet 146 and second electromagnet 148 being fixed to roll gimbal 114. As will be appreciated by those of skill in the art in view of the present disclosure, use of electromagnet 146 allows for selective engagement of magnetic soft stop 134 application of a control current to first electromagnetic 146 and/or second electromagnet 148.

Figure 14:
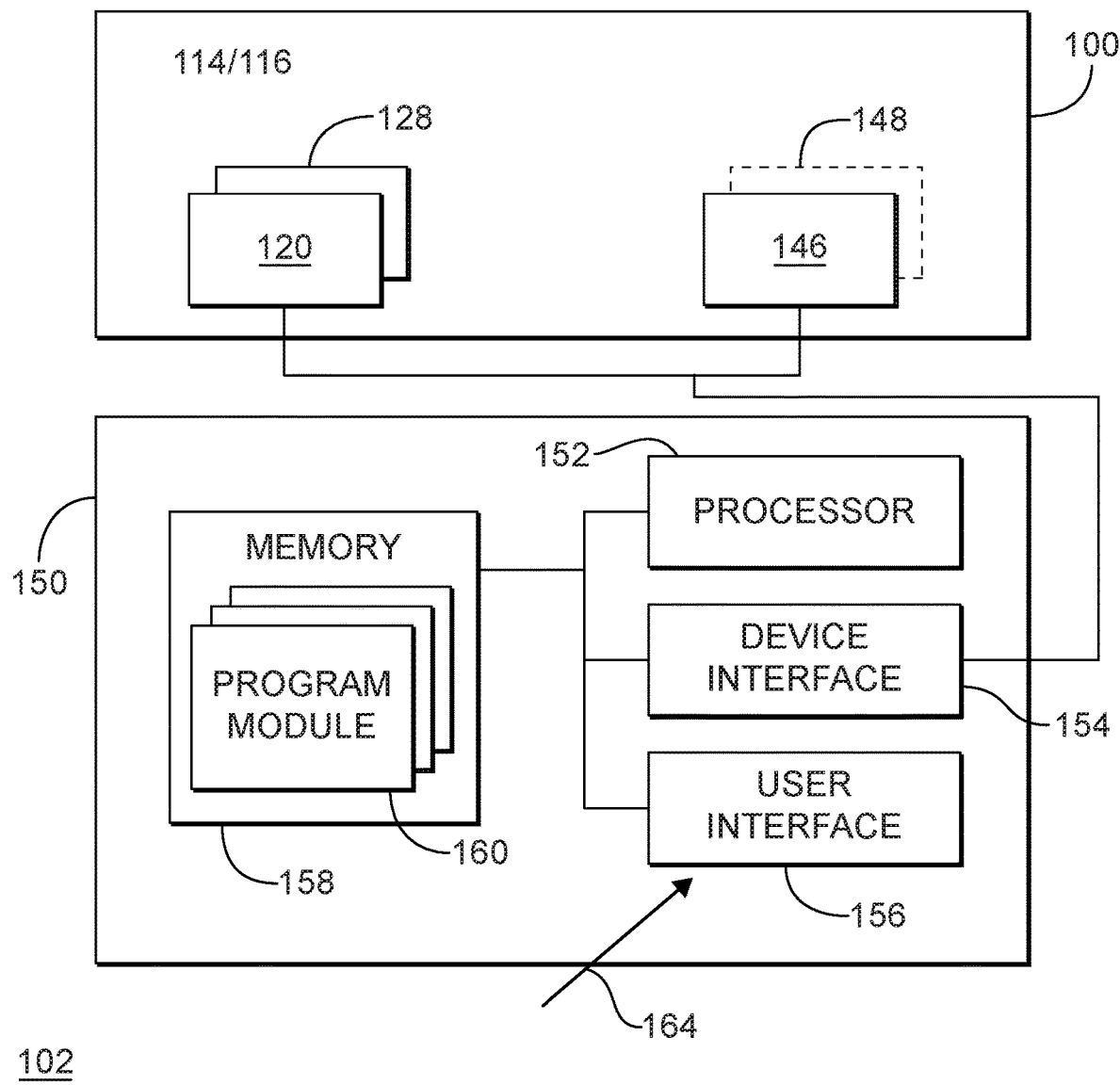
FIG. 14 is a schematic view of the sensor system of FIG. 2, schematically showing a controller operatively connected to an electromagnet.

Referring now to FIG. 14, sensor system 102 is shown according to an embodiment having electromagnet 146 and a controller 150. Controller 150 includes a processor 152, a device interface 154, a user interface 156, and a memory 158. Memory 158 includes a non-transitory machine readable medium having instructions recorded in a plurality of program modules 160 that, when read by processor 152, cause controller 150 to execute certain operations, e.g., operations of an imaging method 200 (shown in FIG. 15), as will be described. In this respect, responsive to a sensor selection input 164 received at user interface 156, controller 150 causes roll resolver/drive arrangement 120 to rotate roll gimbal 114 about roll axis 118 and within a predetermined movement range bounded by magnetic soft stop 134, thereby presenting one of first sensor 130 (shown in FIG. 2) and second sensor 132 (shown in FIG. 2) to a window, e.g., first window 106 (shown in FIG. 1), for imaging a scene.

It is contemplated that rotating roll gimbal 114 about roll axis 118 can include energizing and/or de-energizing electromagnet 146 and/or second electromagnet 148 to selectively cause magnetic soft stop 134 to bound the movement range of roll gimbal 114. For example, when first electromagnet 146 and/or second electromagnet 148 is energized, roll gimbal 114 can have a smaller movement range than when first electromagnet 146 and/or second electromagnet 148 is not energized. Controller 150 can be implemented with software, circuitry, or a combination of both software circuitry.

Figure 15:
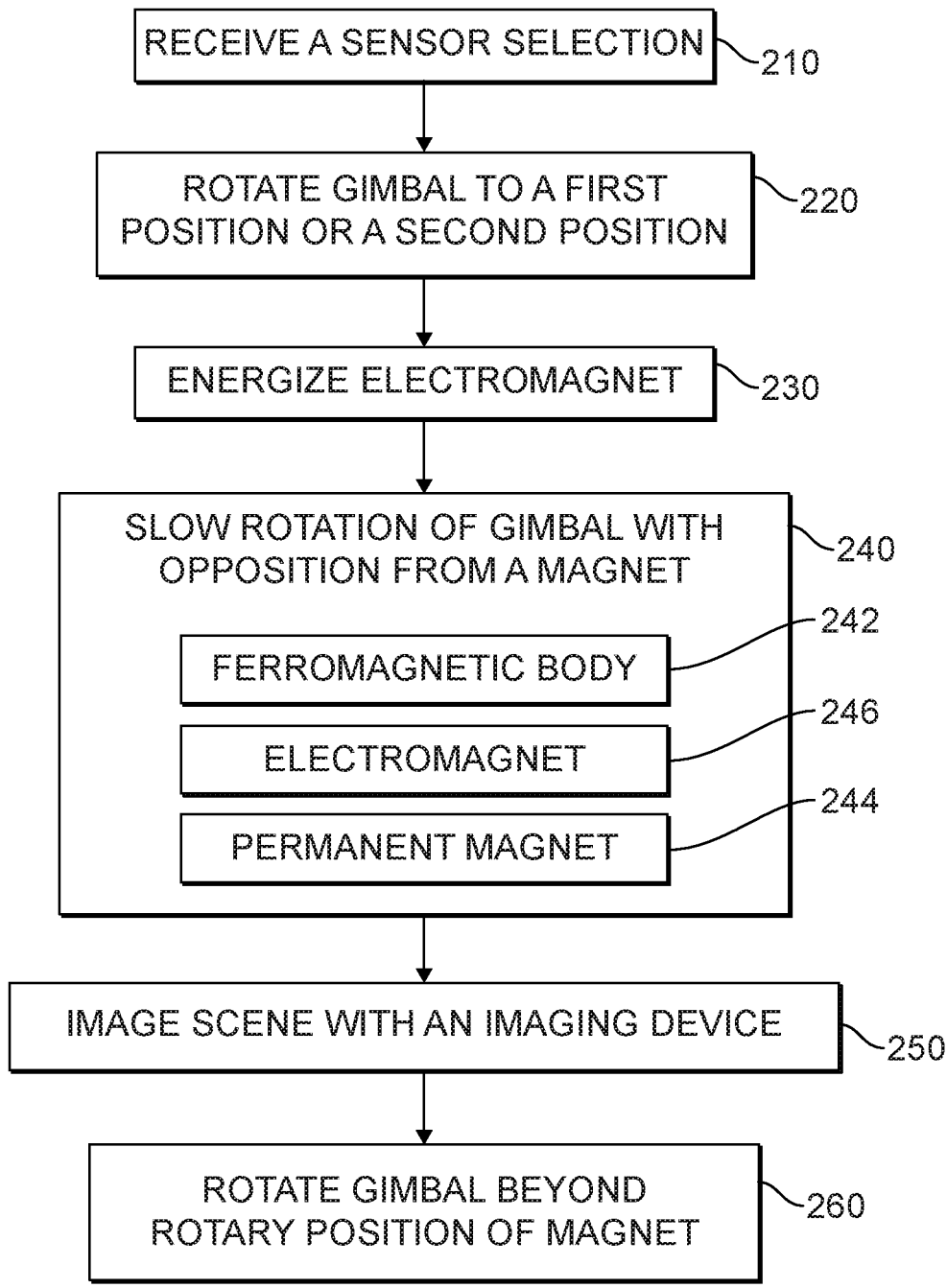
FIG. 15 is a block diagram of an imaging method, showing operations of the imaging method.

Referring to FIG. 15, an imaging method 200 is shown. Imaging method 200 includes receiving, at a sensor system. e.g., sensor system 102 (shown in FIG. 1), a sensor selection, as shown with box 210. Based on the sensor selection the sensor system can rotation a gimbal, e.g., roll gimbal 114 (shown in FIG. 2) of gimbal arrangement 100 (shown in FIG. 1), between a first position a second position, e.g., first position 136 (shown in FIG. 4) and second position 138 (shown in FIG. 5), as shown with box 220. In certain embodiments moving the gimbal between the first position and the second position can include energizing an electromagnet, e.g., first electromagnet 146 (shown in FIG. 9) and/or second electromagnet 148 (shown in FIG. 13).

Using the attractive and/or the repulsive force of the magnetic elements of the magnetic soft stop the magnetic soft stop slows rotation of the gimbal as the gimbal approaches the extreme of the movement range of the gimbal, as shown with box 240. The attractive and/or repulsive force associated with the magnetic soft stop can be exerted on a ferromagnetic member. e.g., ferromagnetic member 142 (shown in FIG. 6), as shown with box 242. The attractive and/or repulsive force associated with the magnetic soft stop can be generated using a permanent magnet, e.g., permanent magnet 140 (shown in FIG. 6, as shown with box 244. The attractive and/or repulsive force associated with the magnetic soft stop can be generated using a first electromagnet, e.g., first electromagnet 146 (shown in FIG. 9) and/or second electromagnet 148 (shown in FIG. 13), as shown with box 246.

Once the gimbal is in the first position or the second position a scene can be imaged using the imaging sensor, as shown with box 250. It is contemplated that moving the gimbal between the first position and the second position can include rotating the gimbal beyond the magnetic soft stop location, such as more than 360 degrees, as shown with box 260.

The methods and systems of the present disclosure, as described above and shown in the drawings, provide for sensor systems with superior properties including relatively low shock loadings in gimbal arrangements when the gimbal reaches the extreme of the gimbal movement range and/or the ability to rotate the gimbal move than 360 degrees without extension and/or damage sensor cabling connected to the gimbal. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A gimbal arrangement, comprising:
a static structure;
a gimbal supported for rotation relative to the static structure;
an actuator operably connected to the gimbal and configured to rotate the gimbal relative to the static structure between a first position and a second position; and
a magnetic soft stop connected between the static structure and the gimbal to slow the rotation of the gimbal relative to the static structure when the gimbal approaches the first position and the second position;
the magnetic soft stop including:
a first magnetic element fixed relative to the static structure; and
a second magnetic element fixed relative to the gimbal;
wherein a magnetic force between the first magnetic element and the second magnetic element is configured to-slow the rotation of the gimbal relative to the static structure when the gimbal approaches the first position and the second position;
a first sensor disposed on a pitch axis of the gimbal at a first side of a roll axis of the gimbal; and
a second sensor disposed on the pitch axis at a second side of the roll axis opposite the first side.

2. The gimbal arrangement as recited in claim 1, wherein one of the first magnetic element and the second magnetic element is an electromagnet.

3. The gimbal arrangement as recited in claim 2, wherein the electromagnet is fixed relative to the static structure.

4. The gimbal arrangement as recited in claim 2, wherein the electromagnet is fixed relative to the gimbal.

5. The gimbal arrangement as recited in claim 1, wherein one of the first magnetic element and the second magnetic element is a permanent magnet.

6. The gimbal arrangement as recited in claim 5, wherein the permanent magnet is fixed relative to the static structure.

7. The gimbal arrangement as recited in claim 5, wherein the permanent magnet is fixed relative to the gimbal.

8. The gimbal arrangement as recited in claim 1, wherein one of the first magnetic element and the second magnetic element is a ferromagnetic body.

9. The gimbal arrangement as recited in claim 8, wherein the ferromagnetic body is fixed relative to the static structure.

10. The gimbal arrangement as recited in claim 8, wherein the ferromagnetic body is fixed relative to the gimbal.

11. The gimbal arrangement as recited in claim 1, wherein there is no mechanical hard stop arranged between the gimbal and the static structure.

12. The gimbal arrangement as recited in claim 1, further comprising a controller operably connected to the magnetic soft stop, wherein the controller is disposed in communication with a memory having instructions recorded on the memory to activate the magnetic hard stop; and
limit rotation of the gimbal relative to the static structure to a predetermined range.

13. A sensor system, comprising:
a gimbal arrangement as recited in claim 1;
a controller operably connected to the magnetic soft stop, wherein the controller is disposed in communication with a memory having instructions recorded on the memory to:
activate the magnetic soft stop; and
limit rotation of the gimbal relative to the static structure to a predetermined range.

14. The sensor system as recited in claim 13, wherein magnetic soft stop comprises:
an electromagnet fixed relative to one of the static structure and the gimbal; and
a permanent magnet fixed relative to the other of the static structure and the gimbal, wherein there is no mechanical hard stop arranged between the gimbal and the static structure.

15. A system, comprising:
a static structure;
a first gimbal arrangement supported for rotation relative to the static structure, the first gimbal arrangement comprising:
an actuator operably connected to a first gimbal and configured to rotate the first gimbal relative to the static structure;
a first magnetic soft stop connected between the static structure and the first gimbal to limit rotation of the first gimbal relative to the static structure to within a predetermined range; and a second gimbal arrangement supported for rotation relative to the first gimbal between a third position and a fourth position, the second gimbal arrangement including:
a second magnetic soft stop arranged between the first gimbal arrangement and the second gimbal arrangement to slow the rotation of the second gimbal arrangement relative to the first gimbal when the second gimbal arrangement approaches the third position and the fourth position, wherein the second magnetic soft stop includes:
 a first magnetic element fixed relative to the first gimbal arrangement; and
 a second magnetic element fixed relative to the second gimbal arrangement;
wherein a magnetic force between the first magnetic element and the second magnetic element is configured to slow the rotation of the second gimbal arrangement relative to the first gimbal when the second gimbal arrangement approaches the third position and the fourth position;
a first sensor disposed on a pitch axis of the gimbal at a first side of a roll axis of the gimbal; and
a second sensor disposed on the pitch axis at a second side of the roll axis opposite the first side.

* * * * *